United States Patent [19]

Sarraf

[11] Patent Number: 4,993,801
[45] Date of Patent: Feb. 19, 1991

[54] OPTICAL HEAD

[75] Inventor: Sanwal P. Sarraf, Webster, N.Y.

[73] Assignee: Eastman Kodak Company, Rochester, N.Y.

[21] Appl. No.: 457,594

[22] Filed: Dec. 27, 1989

[51] Int. Cl.⁵ .................. G02B 6/36; G02B 7/26
[52] U.S. Cl. .................... 350/96.20; 372/36
[58] Field of Search .......... 350/96.20, 96.21; 372/34, 36

[56] References Cited

U.S. PATENT DOCUMENTS

| | | | |
|---|---|---|---|
| 4,295,152 | 10/1981 | Khoe et al. | 350/96.21 |
| 4,604,753 | 8/1986 | Sawai | 372/36 |
| 4,656,635 | 4/1987 | Baer et al. | 372/27 |
| 4,730,335 | 3/1988 | Clark et al. | 372/98 |

Primary Examiner—William L. Sikes
Assistant Examiner—Robert E. Wise
Attorney, Agent, or Firm—Donald D. Schaper

[57] ABSTRACT

An optical head is disclosed which comprises a light source such as a diode laser and an optical element, for example, a collimating lens. The collimating lens and the diode laser are mounted along a common optical axis. A thermoelectric cooling element is provided in the head to control the temperature of the diode laser. In order to precisely locate the collimating lens relative to the diode laser, the housing of the collimating lens is mounted directly onto the barrel of the diode laser.

13 Claims, 2 Drawing Sheets

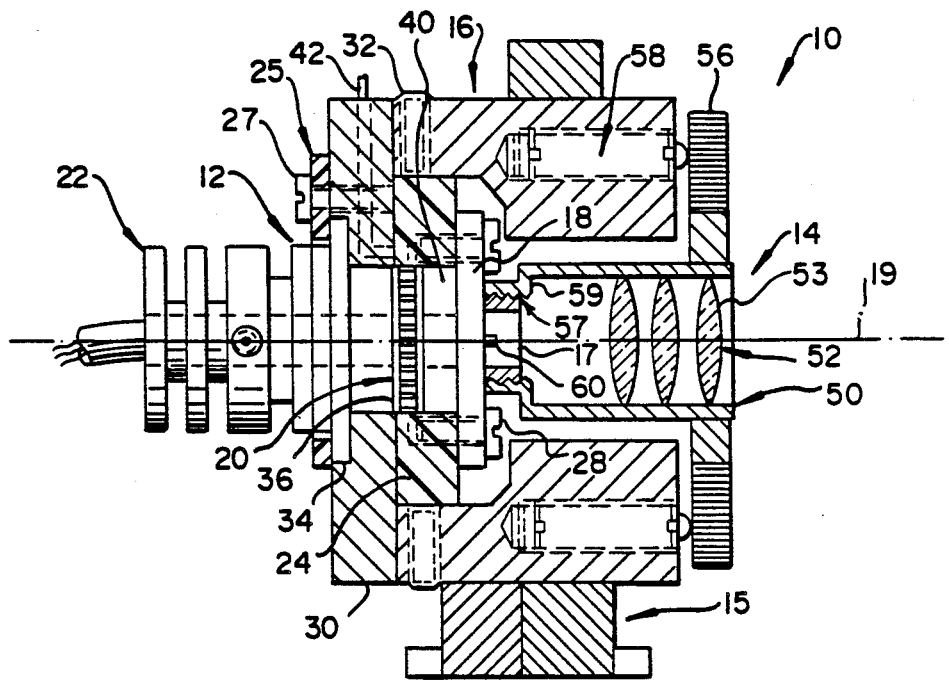

OPTICAL HEAD

CROSS REFERENCE TO RELATED APPLICATION

Reference is made to U.S. patent application Ser. No. 238,225, now U.S. Pat. No. 4,948,221 entitled "Athermalized Optical Head", filed in the name of Thomas E. Yates on Aug. 30, 1988; this application is assigned to the assignee of the present invention.

BACKGROUND OF THE INVENTION

1. Field of the Invention

This invention relates to an optical head which is adapted to support a light source and an optical element, and more particularly, to such an optical head which is particularly suitable for use with a diode laser.

2. Description of the Prior Art

Diode lasers are used in certain types of scanning apparatus to project a laser beam onto a polygon mirror which is adapted to scan the beam onto a recording medium. The laser beam produced by a diode laser is highly divergent, and thus, the beam is normally collimated in order to provide for subsequent shaping of the beam. The collimation is generally achieved by a multi-element circularly symmetric lens assembly of a high numerical aperture. since the effective focal length of such a lens assembly is very small and alignment with the laser chip is quite critical, the mechanical support for the laser and the lens must accurately locate the laser relative to the lens. In order to allow for the flexibility needed to align the optical axis of the laser to that of the lens, the support must have at least three degrees of freedom.

There is also a problem in certain diode laser apparatus in maintaining the focus of a laser spot, since the distance between the diode laser and a collimating lens can change with changes in ambient temperature. As the ambient temperature changes, even slightly, the materials in the supports for the laser and the collimator expand or contract. This movement changes the relative positions of the laser and the collimator and causes the laser spot to be out of focus. The aforementioned patent application Ser. No. 238,225, now U.S. Pat. No. 4,948,221 is directed to an athermalized optical head in which a collimating lens is maintained a constant distance from a diode laser over a range of ambient temperatures.

The problem of precisely locating a diode laser relative to a lens was recognized in U.S. Pat. No. 4,295,152. In this patent, an optical coupler is provided with a telescoping housing which can be adjusted to position a semiconductor laser an exact distance from a lens. One problem with the construction shown in this patent is that great care must be taken to locate the laser relative to the housing in a radial direction. A further problem is that it is very difficult to precisely adjust the telescoping housing in order to obtain a desired axial distance between the laser and the optical element.

SUMMARY OF THE INVENTION

It is an object of the present invention to overcome the problems discussed above in the prior art and to provide an improved optical head for a diode laser.

In accordance with one aspect of the invention, there is provided an optical head comprising: a laser disposed along an optical axis of the optical head, the laser comprising a chip of semiconductor material and a barrel through which a laser beam is emitted: and a collimating lens located along the optical axis, the lens including a lens housing and at least one lens element in the housing, the lens housing being mounted directly on the barrel of the laser.

In one embodiment of the present invention an optical head comprises a light source, such as a diode laser, and an optical element, for example, a collimating lens. The collimating lens and the diode laser are mounted in the head along a common optical axis. A thermoelectric cooling element is provided to control the temperature of hte diode laser. In order to maintain the collimating lens precisely located relative to the diode laser, the lens housing is mounted on the barrel of the laser by means of a threaded connection.

A principal advantage of the present invention is that the disclosed optical head can be used to produce a very high quality image as a result of maintaining the diode laser precisely located relative to the collimating lens. The thermoelectric cooling element which cools the diode laser will also cool the lens housing attached thereto, and thus, the collimating lens will remain in focus over a wide range of operating temperatures. A further advantage of the invention is that the position of the collimating lens can be easily adjusted relative to the diode laser. In the present invention, there is no need for a complex support structure which precisely locates the collimating lens relative to the laser, and thus, the disclosed device is relatively inexpensive to manufacture.

Other features and advantages will become apparent upon reference to the following description of the preferred embodiment when read in light of the attached drawings.

BRIEF DESCRIPTION OF THE DRAWINGS

FIG. 1 is a side elevational view of the optical head of the present invention, with certain parts shown in section;

FIG. 2 is a top plan view of the optical head shown in FIG. 1, with certain parts omitted and certain parts shown in section.

DESCRIPTION OF THE PREFERRED EMBODIMENT

Figure 3:
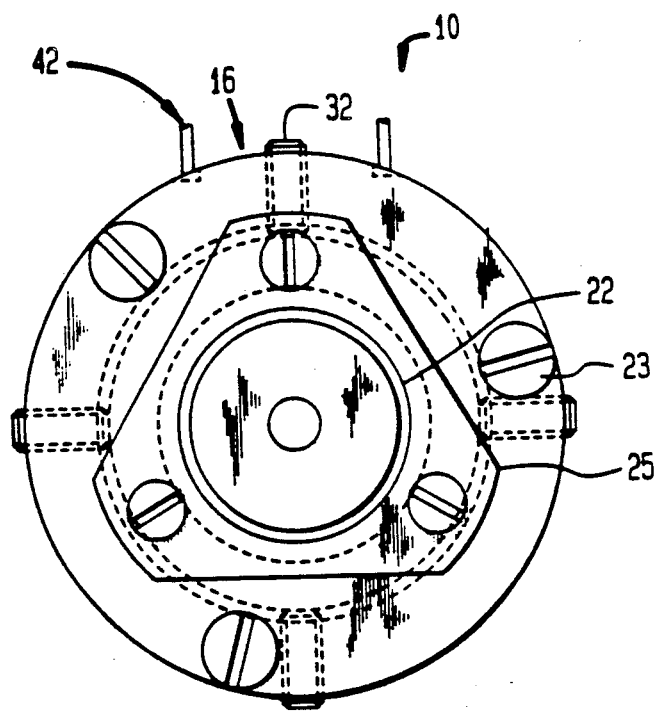
FIG. 3 is an elevational view of the optical head.

With reference to FIG. 1 there is shown an optical head 10 constructed in accordance with the present invention. Optical head 10 comprises a light source 12 and an optical device 14 which are supported in a tubular support 16 along an optical axis 19. Support 16 is mounted in a base 15 which provides a means for mounting the head 10 in an optical device (not shown).

Light source 12 includes a diode laser 18, a thermal transfer plate 40, a thermoelectric cooling element 20, and a heat sink 22. Laser 18 is mounted by means of fasteners 26 to an insulator ring 24 which is made of a glass-filled polycarbonate, for example, such a material is sold under the trademark Lexan 3414 by General Electric Co. Insulator ring 24 is mounted to an annular laser mount 30 by fasteners (not shown), and mount 30 is fixed to support 16 by fasteners 23. Laser mount 30 can be, for example, copper. Set screws 32 in support 16 are threaded into contact with insulator ring 24 to align light source 12 in support 16.

Heat sink 22 is supported in head 10 by means of a retainer 25 which is fixed to mount 30. Retainer 25 is made from an insulating material, such as polycarbonate, and as shown in FIGS. 1 and 2, heat sink 22 is spaced from mount 30 in order to prevent the conduction of heat between the heat sink 22 and mount 30. When screws 27 are tightened against retainer 25, heat sink 22, thermoelectric cooling element 20, and thermal transfer plate 40 are pressed against diode laser 18; the dimensions of element 20 and plate 40 are such that a spacing, shown at 34, is maintained between sink 22 and mount 30.

The thermoelectric cooling element 20 used in the present invention can be, for example, a Marlow, Model No. SP-1507. Thermoelectric cooling element 20 operates according to the well-known Peltier effect. A cold junction is formed at the thermal transfer plate 40 which abuts against laser 18. Energy in the form of heat is absorbed by electrons as they pass from one semiconductor to another in element 20, and in so doing, moving from a low energy state to a high one. Powder supplied to element 20 through electrical conductors 42 provides the energy required to move the electrons through the element. Heat is transferred to heat sink 22 at a hot junction 36 between element 20 and heat sink 22, and heat sink 22 expels the excess heat through a finned radiator (not shown) to the environment. The temperature of diode laser 18 is sensed through thermistor wires 44, and power to thermoelectric element 20 is controlled by a feedback circuit (not shown).

Optical device 14 includes a cylindrical lens housing 50 and a collimating lens 52 in the housing. Collimating lens 52 includes a plurality of lens elements 53. Lens housing 50 is secured to laser 18 by means of a threaded connection 57 in which an end 59 of lens housing 50 is threaded on barrel 17 of laser 18. Other means can be used to secure lens housing directly on the barrel of laser 18, for example, one or more set screws. A threaded connection is preferred, however, since such a connection facilitates adjustment of the axial position of collimating lens 52. An annular flange 56 on lens housing 50 is provided for the adjustment of the axial position of the lens 52 relative to a semiconductor chip 60 in diode laser 18. Annular flange 56 on housing 50 abuts against spring-loaded plungers 58 which serve to maintain the collimating lens 50 in an adjusted position. A set screw or other means (not shown) can be used to lock the lens 52 in an adjusted position.

In a preferred embodiment of the present invention, support 16 is made from Austenitic stainless steel, and ring 24 is made from Lexan 3414 glass filled polycarbonate. Diode laser 18 is a Model No. 8351E, manufactured by Hitachi; this laser is a 50 mw laser which emits at 830 nm. Collimating lens 52 is an NRC lens, Model No. F-L20, which has a focal length and a numerical aperture of 0.5. Diode laser 18 is held at a constant temperature by thermoelectric cooling element 20. Since the housing 50 of lens 52 is mounted directly on barrel 17 of laser 18, the temperature of housing 50 is also controlled by cooling element 20, and thus, changes in ambient temperature do not affect the relative locations of laser 18 and lens 52. The barrel 17 of laser 18 and lens housing 50 are formed of the same material, for example, brass or steel.

The threads in the threaded connection 57 are relatively fine in order to provide a precise adjustment of the collimating lens 52. The collimating lens 52 is circularly symmetric, and thus, in an adjustment of the lens 52, the laser waist is brought to the back focal plane of the lens 52 by rotating the lens housing 50 on the threads in connection 57. The radial position of the chip 60 relative to the barrel 17 is very well controlled in the Model No. 8351E laser. As a result, a precise alignment of the optical axis of the laser with the optical axis of the lens 52 can be obtained by using the barrel 17 as the guiding geometry.

This invention has been described in detail with particular reference to the preferred embodiment thereof, but it will be understood that variations and modifications can be effected within the spirit and scope of the invention. For example, although the present invention has been described with reference to a diode laser and collimating lens, it will be apparent to those skilled in the art that the invention could be used with other light sources, for example a light-emitting diode, and with other optical elements, for example, a prism.

I claim:

1. An optical head comprising:
   a diode laser disposed along an optical axis of said optical head, said laser comprising a chip of semiconductor material and a barrel through which a laser beam is emitted; and
   a collimating lens located along said optical axis, said lens including a lens housing and at least one lens element in said housing, said lens housing being mounted directly on the barrel of said laser by means of a threaded connection.

2. An optical head, as defined in claim 1, wherein said lens housing includes an annular flange for adjusting the position of said lens element relative to said chip.

3. An optical head, as defined in claim 1, wherein said housing and said lens barrel are formed of the same material.

4. An optical head, as defined in claim 3, wherein said material is brass.

5. An optical head, as defined in claim 3, wherein said material is steel.

6. An optical head, as defined in claim 1, wherein a thermoelectric cooling element is mounted in a position to control the temperature of said laser and said lens housing.

7. An optical head, as defined in claim 6, wherein said laser is mounted to an insulator ring.

8. An optical head, as defined in claim 7, wherein said cooling element is supported in said insulator ring.

9. An optical head, as defined in claim 8, wherein said insulator ring is supported in a tubular housing.

10. An optical head, as defined in claim 1, wherein said lens includes a plurality of lens element in said housing.

11. An optical head comprising:
    a diode laser disposed along an optical axis of said optical head, said laser comprising a chip of semiconductor material and a barrel through which a laser beam is emitted;
    a collimating lens located along said optical axis, said lens including a lens housing and at least one lens element in said housing, said lens housing being threadably received on the barrel of said diode laser; and
    a tubular support for receiving said laser and said lens.

12. An optical head, as defined in claim 11, wherein said laser is mounted to an insulator ring which is received in said support.

13. An optical head, as defined in claim 12, wherein a thermoelectric cooling element is received in said insulator ring.

* * * * *